(12) United States Patent
Anderegg et al.

(10) Patent No.: US 6,600,854 B2
(45) Date of Patent: Jul. 29, 2003

(54) OPTICAL FIBER POLISHING SYSTEM WITH DEPTH REFERENCE

(75) Inventors: Jesse Anderegg, Salt Lake City, UT (US); Bret Winkler, South Jordan, UT (US); Allen Tanner, Sandy, UT (US)

(73) Assignee: Evans & Sutherland Computer Corporation, Salt Lake City, UT (US)

(*) Notice: Subject to any disclaimer, the term of this patent is extended or adjusted under 35 U.S.C. 154(b) by 248 days.

(21) Appl. No.: 09/799,164

(22) Filed: Mar. 5, 2001

(65) Prior Publication Data
US 2002/0122620 A1 Sep. 5, 2002

(51) Int. Cl.[7] .............. G02B 6/26; G02B 6/42; G02B 6/00
(52) U.S. Cl. .......................... 385/30; 385/147
(58) Field of Search ................. 385/30, 28, 29, 385/37, 40, 147, 140, 12, 13; 356/73.1

(56) References Cited

U.S. PATENT DOCUMENTS

| 4,335,933 A | 6/1982 | Palmer |
| 4,343,532 A | 8/1982 | Palmer |
| 4,398,794 A | 8/1983 | Palmer et al. |
| 4,398,795 A | 8/1983 | Palmer |
| 4,431,260 A | 2/1984 | Palmer |
| 4,536,058 A | 8/1985 | Shaw et al. |
| 4,630,884 A | * 12/1986 | Jubinski ............... 356/73.1 |
| 4,795,226 A | * 1/1989 | Bennion et al. ........... 385/12 |
| 5,136,818 A | 8/1992 | Bramson |
| 6,370,312 B1 | * 4/2002 | Wagoner et al. ......... 385/140 |
| 6,374,011 B1 | * 4/2002 | Wagoner et al. .......... 385/30 |

* cited by examiner

Primary Examiner—Chandrika Prasad
(74) Attorney, Agent, or Firm—Thorpe North & Western, LLP

(57) ABSTRACT

A system and method for polishing an optical fiber with a polishing lap. The system comprises a substrate, an optical fiber disposed on the substrate so as to be outwardly curved, and an electrical conductor disposed over the outward curve of the optical fiber. A voltage source is connected to the electrical conductor, and the polishing lap is configured to initially abrade the electrical conductor to cause severance thereof. The position of the polishing lap when the electrical conductor is severed represents a reference point approximately indicating the surface of the optical fiber. A detector connected to the electrical conductor detects a change in voltage therein, indicating severance of the electrical conductor, and subsequently monitors the polishing depth relative to the reference point.

20 Claims, 2 Drawing Sheets

OPTICAL FIBER POLISHING SYSTEM WITH DEPTH REFERENCE

BACKGROUND

1. Field of the Invention

This invention relates to methods for polishing optical fibers. More particularly, the present invention relates to a precision method for controlling the depth to which a grinding or polishing device abrades the surface of an optical fiber.

2. Description of Related Art

While the concept of optical conductors has been around for more than a hundred years, advances made within the past forty years or so have made them the preferred communications transmission medium today. This is because of their low-loss transmission, high-information-carrying capacity, small size and weight, immunity to electromagnetic interference, unparalleled signal security, and the abundant availability of the raw materials (i.e. ordinary sand) required to make them. While they are higher in cost than conventional electrical conductors, their benefits are believed to far outweigh the slightly higher cost. As a result, fiber optic communication lines are gradually replacing conventional electrical communication lines at an increasingly rapid rate. For example, it is estimated that from 1970 to 1998, over 100 million kilometers of optical fibers were installed worldwide.

One of the greatest benefits of optical fiber communication lines is their enormous data handling capacity. For example, using advanced transmission techniques, a single pair of copper telephone wires can be made to carry about two dozen simultaneous conversations. However, by the mid 1980's, it was already possible to transmit more than 12,000 simultaneous conversations over a single pair of optical fibers. The first transatlantic fiber optic cable, completed in 1988, could carry 40,000 simultaneous conversations using just two pairs of optical fibers. Advances since that time have increased the capacity of fiber optic transmission lines even more.

Couplers, amplifiers, etc. have been developed for use with optical fibers. These components typically involve coupling two or more optical fibers together in such a way that light signals traveling in one fiber may be transmitted either partially or completely into another fiber. To accomplish this, it is necessary to remove a portion of the reflective outer layer of the fiber, and produce a facet on an end or side of the fiber where light energy may enter and/or leave the core of the fiber. Polishing a fiber on its side and exposing the inner structures allows one to access the energy propagating in the fiber. This is usually done by polishing the fiber with a polishing lap.

Optical fibers vary in diameter from about 0.05 millimeters (50 μm) to about 0.4 millimeters (400 μm), and their inner structures have diameters much smaller. Since these fibers are so small and difficult to manipulate, it is very difficult to accurately polish a facet on the side of the fiber. Several methods have been employed to measure and control the depth of polishing of optical fibers. Visual inspection using microscopes has been employed for inspecting polished fibers after polishing to verify their depth of polish. See, e.g. U.S. Pat. No. 4,431,260 to Palmer.

Another method is to monitor power loss in the fiber caused by out-coupling to the polishing solution. A lubricating and cooling polishing solution is normally used when polishing an optical fiber in order to achieve a smooth, flat, polished surface which provides the desired optical properties. As the fiber is polished and the polished surface increases in size and approaches the center of the optical conductor, a signal introduced into one end of the fiber can be measured at the other end to determine the power loss which is caused by out-coupling of the signal to the polishing solution. This power loss gives a measure of the size and depth of the polished surface, and can be used to determine when to stop polishing. See e.g. U.S. Pat. No. 5,136,818 to Bramson.

Still another method involves placing a collimated light beam tangentially incident to a flat on an optical fiber while the flat is being progressively polished. A portion of the incident light from the light beam is transmitted into the optical fiber, the amount of transmitted light being a function of the surface area of the optical flat. By measuring the intensity of the light transmitted through the fiber, one can obtain a measure of the size of the flat. See e.g. U.S. Pat. No. 4,630,884 to Jubinski.

Unfortunately, some prior methods do not actually control the depth of polishing, but merely view the results of polishing after the fact. Where a polishing machine is adjusted based upon visual inspection of a polished fiber, this may not ensure acceptable or repeatable results.

SUMMARY

It has been recognized that it would be desirable to have a reliable method for securing an optical fiber and accurately controlling the depth of polishing when the surface of the fiber is polished with a polishing lap. It is also recognized as desirable to have a simple and effective method for measuring the depth of polishing on a microscopic scale.

The present invention advantageously provides a system for polishing an optical fiber, comprising: an optical fiber disposed upon a substrate, the fiber having an outwardly curved portion; an electrical conductor disposed over the apex of the outward curve of the optical fiber; and a voltage source connected to the electrical conductor. A polishing lap of a polishing machine is brought to bear upon and grind away the electrical conductor, such that the electrical conductor is severed at approximately the same moment the polishing lap contacts the apex of the curve of the optical fiber. A detector detects when the DC voltage in the conductor suddenly changes, indicating severance of the electrical conductor, which indicates that the polishing lap has just reached the top surface of the optical fiber. This position is called the reference point. The polishing lap is then caused to progressively polish the fiber until a desired depth is reached relative to the reference point, the depth of polishing being detected with an optical probe. The invention also provides a method of polishing an optical fiber using the described system.

In accordance with a more detailed aspect of the present invention, the substrate comprises a piece of fused silica, in which one or more grooves are formed in which the optical fiber and the electrical conductor are cemented. One of the grooves is formed with an outwardly curved bottom surface, such that when the optical fiber is placed therein it will assume the desired outwardly curved configuration in preparation for polishing.

In accordance with another more detailed aspect of the present invention, the detector may comprise a digital interface electrically connected to the electrical conductor, and configured for detecting a voltage change therein, and a computer connected to the digital interface and the polishing lap, and configured for receiving signals from the digital interface, and for controlling the functioning of the polishing lap. Based upon the detection of severance of the electrical conductor, the polishing lap may be caused to polish to a predetermined desired depth, whereupon the computer may cause the polishing lap to stop polishing.

In accordance with another more detailed aspect of the present invention, the electrical conductor may comprise a copper wire which is placed over the apex of the outward curve of the optical fiber. Alternatively, the electrical conductor may comprise a stripe of conductive paint which is applied over the apex of the curve of the optical fiber, and electrically connected to the detector.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 5 is an illustration of a micrograph of an optical fiber and retaining wire just after the retaining wire has been ground completely through.

DETAILED DESCRIPTION

Figure 1:
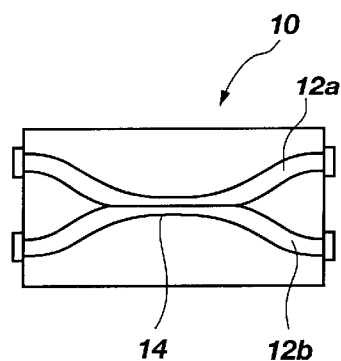
FIG. 1 is a side elevation view depicting a conventional fiber optic coupler requiring optical conductors with polished surfaces.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

With reference to FIG. 1, one type of conventional fiber optic coupler 10 is shown, having curved optical conductors 12a and 12b with polished coupling surfaces 14. The coupling of two or more optical fibers together in this way allows light signals traveling in one fiber to be transmitted either partially or completely into the other fiber. Forming the coupling surfaces usually involves the use of a polishing lap which grinds and removes a portion of the reflective outer layer of the fiber (16 in FIG. 2), followed by a portion of the inner structure or core of the fiber, to produce a flat or face or facet 14 through which light energy may enter and/or leave the core of the fiber. By controlling the precise geometry of the opposing polished surfaces 14, and the chemical makeup of the fibers relative to the wavelength of light which is desired to pass from one fiber to the other (and relative to any undesirable wavelengths), a user may access the desired energy propagating in the fiber for amplifying or combining signals as desired.

It has been found that precisely controlling the depth to which the polishing lap removes material from the fiber is extremely important. Prior methods of visual inspection followed by trial and error have not proved suitable to allow fast and accurate fabrication of polished surfaces on optical fibers. Likewise, measuring out-coupling of light signals from a polished fiber during polishing is cumbersome and expensive to employ, and limits the speed of manufacturing. Accordingly, the inventors have developed a system and method of accurately controlling the depth of polishing of an optical fiber.

Figure 2:
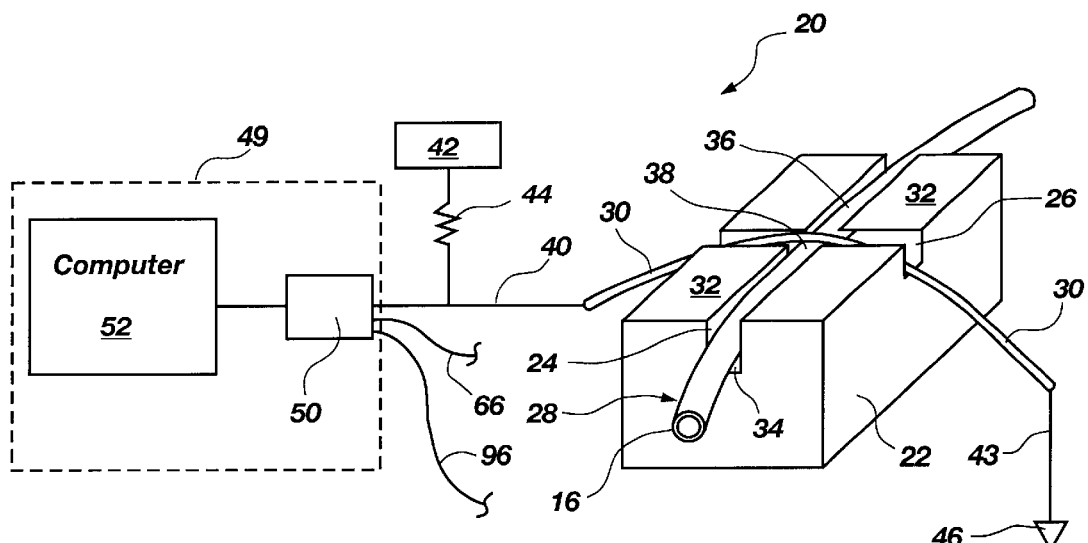
FIG. 2 is a partially schematic, partially pictorial view of a polishing control system in accordance with the present invention.

Referring to FIG. 2 a polishing control system 20 in accordance with the present invention is shown which allows accurate control of the depth of polishing of an optical fiber. This system generally comprises a fused silica substrate 22 having perpendicular grooves 24 and 26 formed therein, the first groove 24 being formed to accommodate an optical fiber to be polished 28, and the second groove 26 being formed to accommodate a retaining wire 30. Fused silica is a suitable material for the substrate because it is the same material as the optical fiber, and therefore polishes at the same rate as the fiber. This prevents irregular or inconsistent removal of material from the substrate vs. the fiber, especially where the abrasive polishing surface is somewhat elastic, and not extremely rigid. Other substrate materials, such as PYREX or plastics, could also be used. The grooves in the substrate are configured to place the fiber 28 at a precise orientation for polishing relative to the top surface 32 of the substrate.

The bottom 34 of the first groove 24 is radially curved toward the top surface 32 of the substrate, and is preferably formed with a depth and radius of curvature such that the top surface 36 of the optical fiber 28 is just tangent to the top surface 32 of the substrate (or slightly below the top surface within the first groove) when disposed within the groove. The optical fiber may be affixed within the first groove using any suitable adhesive or method of cementing an optical fiber. The first groove 24 is cut so that the apex of the curve, or the point of tangency to the top surface, occurs at the intersection of the second groove 26 with the first, so that the retaining wire 30 crosses over the optical fiber at the apex of its curve when lying against the bottom of the first groove.

Figure 4:
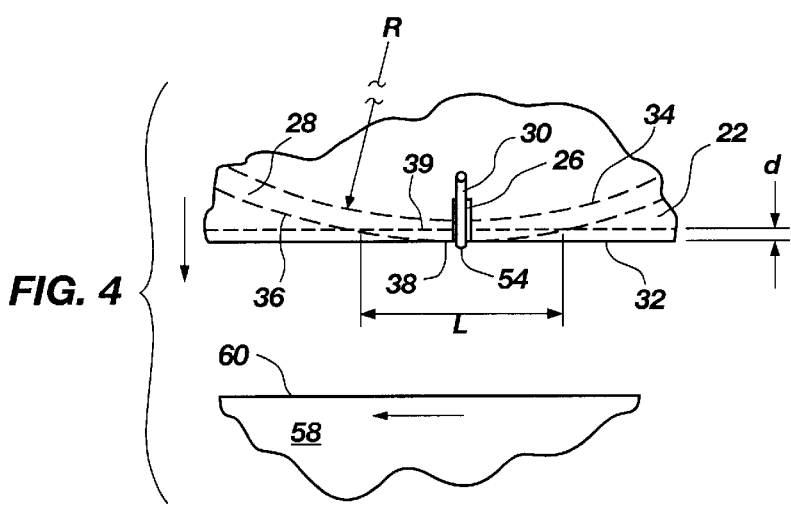
FIG. 4 is a fragmented side profile view of the optical fiber and retaining wire as they are about to contact the polishing lap.

As shown in FIG. 4, the curvature of the first groove is selected such that for a given depth of polish d, the fiber will obtain a flat surface (shown by dashed line 39) of length L. Those skilled in the art will recognize that the length L is frequently chosen as some multiple of the wavelength of light which is to be transferred between coupled fibers, such as shown in FIG. 1.

The retaining wire 30 may be a copper wire or any other electrical conductor, and is placed over the optical fiber 28 at the apex 38 of the curve of the fiber. The retaining wire is connected on one end by electrical line 40 to a voltage source 42. The voltage source can be 5 volts DC, providing this voltage through a resistor 44, such as a 1000 Ω resistor. The retaining wire is connected at the other end to ground 46 by an electrical line 48.

Connected to the voltage supply side of the retaining wire is a detector 49, generally comprising a digital interface 50, and a computer 52. The digital interface includes an analog-to-digital converter, and receives the DC voltage in the wire 40, converts it to a digital signal, and transmits that signal to the computer. The digital interface may be a digital receiver card in the computer, to which the electrical line 40 is connected. A suitable card for this purpose is the PC-6024E made by National Instruments of Austin, Tex. The parallel port on a conventional personal computer may also be used as the digital interface, in conjunction with appropriate software.

The process of polishing a fiber involves four general steps: pre-grinding, process initiation, controlled lapping, and process termination. In the pre-grinding step, the fiber 28 is first cemented into the first groove 24 of the fused silica substrate 22, and the retaining wire 30 is placed in groove 26 and over the fiber at the apex 38 of the curve, as mentioned. FIG. 4 shows a close-up inverted profile view of the optical fiber and retaining wire disposed in the substrate.

For best results, the groove 26 in which the retaining wire sits must be accurately machined to position the apex of the curve of the fiber at the intersection of the retaining wire groove. This can be accomplished through a wide variety of precision machining methods. The inventors have used a precision sawing machine (not shown) such as the Ultraslice 2000 made by Ultratec Manufacturing, Inc. of Santa Ana, Calif. This machine includes a circular saw blade with a horizontal spindle, disposed above a horizontal translational table configured for independent horizontal motion in two orthogonal directions. Using a power operated precision swing arm mounted to the translational table, a raw piece of substrate material may be fixed to the end of the arm, and the arm brought toward the blade by moving the table. The swing arm is programmed to plunge the substrate into the blade a precise distance, and then rotate and/or translate the substrate in the plane of the saw blade to form the curved groove.

This is just one example of many possible methods that may be used to accurately locate and form the grooves in the substrate. Following this method, the inventors have successfully machined a groove in the substrate to position the apex of the curve within about 150 μm of the desired location. With greater care, the inventors can accurately machine the groove to place its apex at the desired location with an accuracy about equal to the diameter of the retaining wire (usually about 90 μm). With reference to FIG. 4 the curved bottom surface 34 of the first groove 24 is more clearly shown, having a radius R. It will be apparent that the length L of the region which will be polished on the fiber depends upon the radius of curvature of the bottom 34 of the groove 24, and the depth d of polishing.

While the illustrative embodiments shown and described herein disclose a substrate having a groove with a radially curved bottom surface to provide the desired curvature of the optical fiber, it will be apparent that other configurations could be devised to accomplish the same result. For example, the curvature of the bottom of the first groove may be parabolic, elliptical, or some other type of curvature other than radial. Alternatively, some or all of the first groove 24 could be straight, with a curved or angular protrusion which causes the optical fiber to assume an outwardly curved shape.

Figure 3:
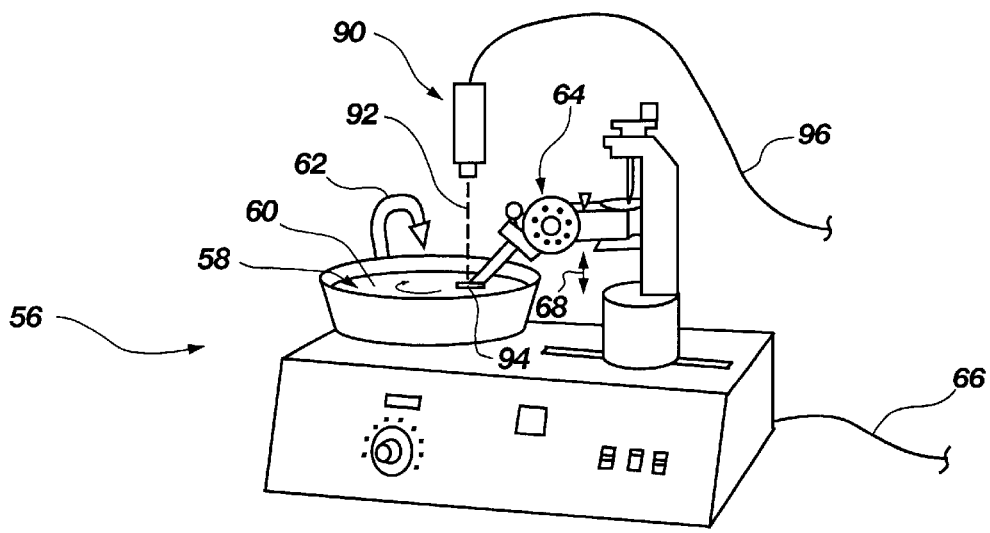
FIG. 3 is a pictorial view of a polishing machine suitable for use in accordance with the present invention.

Polishing of the surface of the fiber is preferably accomplished using a precision rotary lapping machine 56 such as that depicted in FIG. 3. This machine generally comprises a horizontal rotating platen 58 with an abrasive pad 60 attached to its upper surface. Many types of abrasive pads are suitable, such as diamond-impregnated mylar film, adhesive-backed diamond grit pads, expanded polyurethane pads, or felt pads in combination with cesium oxide and/or colloidal silica slurries. Other abrasive surfaces or solutions known in the industry may also be used. A polishing solution supply tube 62 is disposed above the rotating platen to supply a constant flow of polishing solution to the surface of the platen during lapping, in a manner well known in the art. The polishing solution may act as a coolant, a lubricant, and/or provide additional abrasive particles. A rotary lapping machine suitable for use in accordance with the present invention is the Ultrapol 1200 polishing machine made by Ultratec Manufacturing, Inc. of Santa Ana, Calif.

A moveable arm 64 is disposed adjacent to the platen 58 and abrasive surface 60, and is configured to move up and down (as indicated by arrow 68) relative to the abrasive surface 60. The arm 64 may also be configured to oscillate back and forth to provide more even polishing action and to account for possible irregularities in the abrasive surface. A suitable arm is the UT Series 1600 Micropositioner, also made by Ultratec Mfg., Inc. Prior to the grinding stage, the retaining wire 30 is preferably pre-ground to remove a large portion of its cross-section before computer controlled polishing is begun (as indicated by the flattened spot 54 on the wire in FIG. 4). The substrate 22 with the fiber 28 and retaining wire 30 assembled together is then disposed, inverted, on the end of the moveable arm, above the abrasive surface, and the arm is caused to move downward to press the top of the retaining wire and fiber assembly against the platen. The arm may also oscillate back and forth, as mentioned. In the process initiation step, the arm 64 is initially brought down against the abrasive surface 60, such that the abrasive surface initially contacts the retaining wire 30, and polishes it until the wire is completely severed, as detected by the Digital interface 50.

Figure 5:
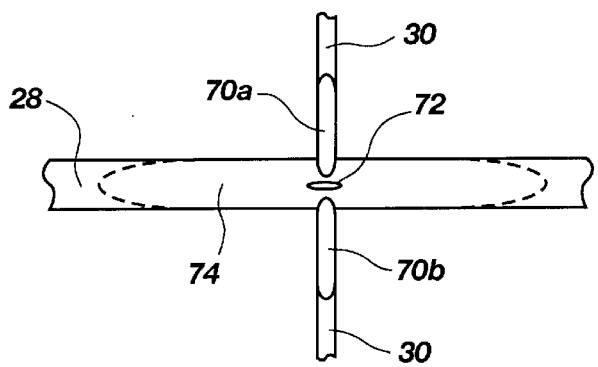

Referring to FIG. 5, there is shown a magnified view of an optical fiber 28 and retaining wire 30 just after the retaining wire has been ground completely through. This figure illustrates what is seen in micrographs of test samples wherein polishing was discontinued immediately upon detection of severance of the retaining wire, and the samples removed from the polishing lap. As the large disconnected elliptical faces 70a and 70b of the retaining wire show, the lap had ground completely through the retaining wire, and had reached the jacket of the fiber 28, and just begun to polish it, as shown by the small elliptical face 72 on the fiber. The detector 49 detects the moment that the polishing lap severs the retaining wire because the voltage in wire 40 will abruptly peak with the severance of the connection to ground 46.

With reference to FIGS. 2 and 3, the polishing lap 56 and arm 64 are interconnected to the computer 52 via communications line 66, which may connect to the digital interface 50. Communications line 66 typically carries a 5 volt signal to switch a 120 volt relay (not shown), which turns off the rotating lap and the arm. The arm typically includes a micrometer-type depth gauge (not shown) which may be used to monitor and control the depth of polishing. The accuracy of such mechanical depth gauges is limited by their resolution, which is about ±5 μm.

However, the inventors have found that they can use an optical probe 90 to more accurately detect and control the depth of polishing. The optical probe is disposed vertically above the end of the arm 64, and reflects a light beam 92 off of a mirror 94 mounted to the end of the arm. A suitable optical sensor is the MTI 2000 Fotonic Sensor manufactured by MTI Instruments, Inc. of Albany, N.Y. This system uses an arc lamp light source, which sends a light beam through sending optical fibers in the probe 90. The light beam 92 from the sending fibers reflects off of the mirror 94, and the reflection is received by receiving optical fibers, also contained in the probe 90. The probe detects the intensity of the received beam, and compares this to the known intensity of the sent beam. Because the rate of diminution of light intensity with distance is well known, the intensity reduction of the received light provides a very accurate relative measure of distance. This optical detection system has a resolution of about 30 nm, which has allowed the inventors to more accurately monitor and control the depth of polishing.

The optical probe 90 is connected to the detector 49 via an electrical line 96 which connects to the digital interface 50. The digital interface converts the output voltage of the optical probe to a digital signal, and sends the signal to the computer 52. The output voltage from the optical probe is proportional to the displacement of the mirror, and may be calibrated to give distances in absolute terms. At the moment that the detector 49 detects a voltage change in wire 40, which indicates severance of the retaining wire 30, the computer 52 also notes the position of the arm, as represented by the output voltage of the optical probe. This position represents (within some tolerance) the top surface 38 of the optical fiber 28, and establishes a reference point from which the computer controls further polishing and tracks the depth of material removed.

The system then commences controlled lapping, the third step, wherein the arm 64 gradually moves downward against the abrasive surface 60, and progressively polishes away the optical fiber and the substrate until reaching the programmed polishing depth d, as indicated by the output voltage of the optical probe (or the position of the micrometer, mentioned above). The detector 49 continuously analyzes the output voltage of the optical probe 90, and calculates the depth of material removed and/or the depth of material remaining based on this information. The result is highly accurate control of the depth of polishing, which results in accurate control of the geometry of the polished surface.

Once the detector 49 detects that the desired polish depth has been reached, it signals the user that the process is complete, and the user may retract the arm 64 from the polishing surface 60. Alternatively, the computer 52 may send a signal to stop the rotation of the platen 58 through the digital interface 50 and communications line 66. Referring to FIG. 5, the ultimately desired polished surface of the optical fiber 28 is indicated by the large semi-elliptical area 74. Referring back to FIG. 3, automatic control of the polishing lap may also be accomplished by interconnection of a timer circuit associated with the polishing machine 56, with the detector 49. When the desired polishing depth d is reached and detected, the computer 52 may send a signal to the polishing machine to turn off the rotating platen and the oscillating arm simultaneously. Using this latter method, the inventors have effectively polished fibers to a desired polishing depth.

Initial testing of The system has been found to be a reliable method for determining when the polishing lap has reached the surface of the fiber. In a test which produced the results illustrated in FIG. 5, for example, the inventors found that upon detection of severance of the retaining wire, the fiber had actually been penetrated a distance of 2.2±0.2 $\mu$m, as indicated by the small ellipse 72. This slight penetration of the optical fiber can easily be accounted for when calibrating the polishing lap for the overall depth of polish. In other words, the reference point may or may not actually represent the exact position of the outer surface of the fiber. Rather, the reference point may represent a level slightly below the outer surface of the fiber. Because the reference point can vary slightly from the actual surface of the fiber, through calibration the polishing depth can be adjusted by the amount of a typical variance to more closely produce the results desired. The accuracy of the reference point is a function of how accurately one can place the reference wire at the apex of the curve of the fiber. The inventors have been successful in accurately placing the wire at the apex, such that the total error in overall polishing depth can be kept to about ±0.7 $\mu$m.

Figure 6:
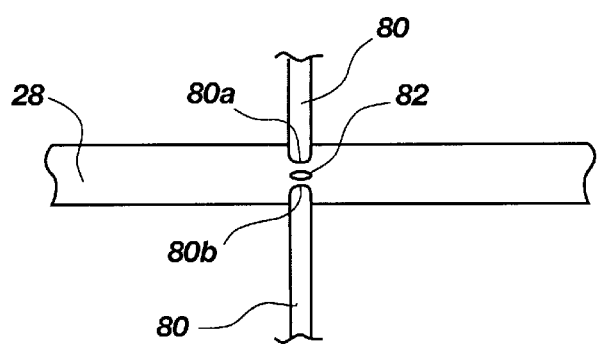
FIG. 6 is an illustration of a micrograph of an optical fiber just after the conductor has been ground through, where the electrical conductor is a stripe of electrically conductive material applied to the optical fiber.

Viewing FIGS. 2 and 6, in an alternative embodiment, a stripe 80 of electrically conductive material, such as conductive silver paint, may be applied to the optical fiber 28 to provide an indication of the reference point, rather than using a retaining wire. The conductive stripe 80 is electrically connected at one end to the voltage source 42 (through resistor 44) and the detector 49, and grounded on the other end at 46 in the same manner as shown for the retaining wire. When the polishing lap (58 in FIG. 4) polishes through and severs the conductive stripe 80, the detector detects the change in voltage, and determines the reference point accordingly.

Viewing FIG. 6 there is shown an illustration of a micrograph of an optical fiber just after an electrically conductive paint stripe has been polished through. Here, a small elliptical flat 82 is present on the outer jacket of the fiber 28, between the discontinuous ends 80a and 80b of the conductive stripe 80. In a test which produced the results depicted in FIG. 6, the inventors found that the lap 56 penetrated the fiber 28 to a distance of only 0.6±0.1 $\mu$m when severance of the conductive stripe 80 was detected. Again, this slight penetration of the optical fiber can easily be accounted for when calibrating the polishing lap (58 in FIG. 3) for the overall depth of polish.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A system for polishing an optical fiber with a polishing lap, comprising:

a substrate;

an elongate optical fiber disposed on the substrate so as to be outwardly curved;

an electrical conductor disposed over the outward curve of the optical fiber;

a voltage source connected to the electrical conductor for supplying a voltage thereto;

wherein the polishing lap is configured to initially abrade the electrical conductor to cause severance thereof, the position of the polishing lap when the electrical conductor is severed representing a reference point relative to the surface of the optical fiber;

a detector configured for detecting a change in voltage in the electrical conductor, said change being indicative of the severance of the electrical conductor, and for monitoring the polishing depth relative to the reference point.

2. The system of claim 1, wherein the electrical conductor is selected from a group comprising: a wire; and a stripe of electrically conductive material applied to the optical fiber.

3. The system of claim 1, wherein the substrate further comprises a substantially solid block having:

a top surface;

a first groove formed in the top surface, the first groove sized to allow insertion of a portion of the optical fiber therein, and further having an outwardly curved bottom surface configured to cause the portion of the optical fiber disposed therein to curve outwardly, such that a side of the fiber is approximately tangent to the top surface of the substrate; and a second groove formed in the top surface and oriented substantially perpendicular to the first groove, the second groove sized to allow insertion of a portion of the electrical conductor therein, said portion of the electrical conductor extending out of the second groove and overlying the outward curve of the optical fiber approximately at its point of tangency to the top surface.

4. The system of claim 3, wherein the substrate comprises fused silica.

5. The system of claim 1, wherein the polishing lap comprises a rotary lapping machine having:

a horizontal rotating platen with an abrasive surface;

a polishing solution delivery conduit for supplying a constant flow of polishing solution to the surface of the platen;

a moveable arm disposed adjacent to the platen, configured to receive the substrate with the optical fiber and the electrical conductor disposed thereon, attached to a distal end of the moveable arm, and to move up and down relative to the abrasive surface, so as to press the electrical conductor, optical fiber and substrate against the abrasive surface of the platen.

6. The system of claim 5, wherein the abrasive surface is selected from a group consisting of:

a first pad, comprising diamond grit;

and, a second pad, comprising one of two materials consisting of felt and expanded polyurethane, said second pad being provided with a slurry of at least one of cesium oxide and colloidal silica.

7. The system of claim 1, wherein the detector further comprises:

a digital interface electrically connected to the electrical conductor, and configured for converting an analog signal to a digital signal; and a computer connected to the digital interface and the polishing lap, and configured for receiving signals from the digital interface, and for controlling the functioning of the polishing lap in response thereto.

8. The system of claim 1, further comprising a depth sensor configured for sensing the depth of polishing of the optical fiber relative to the reference point.

9. The system of claim 8, wherein the depth sensor comprises an optical probe.

10. A system for controlling the depth to which a movable polishing lap polishes an optical fiber, comprising:

an optical fiber, disposed upon a substrate, the fiber having a curved portion which extends toward a top surface of the substrate;

an electrical conductor disposed over an apex of the curve of the optical fiber;

a voltage source connected to the electrical conductor, for supplying a voltage thereto; and a detector, further comprising:

a digital interface connected to the electrical conductor, and configured for converting an analog signal in the electrical conductor to a digital output signal; and a computer connected to the digital interface, for receiving the output signal therefrom, and for controlling the polishing lap, whereby the polishing lap may be caused to operably impinge upon and sequentially grind away the electrical conductor and the optical fiber until a sudden change in the voltage in the electrical conductor is detected, said voltage change indicating severance of the electrical conductor, the position of the polishing lap when severance of the electrical conductor is detected providing a reference point relative to the surface of the optical fiber for controlling the depth of continued polishing.

11. The system of claim 10, wherein the substrate further comprises a substantially solid block having:

a first groove formed in the top surface thereof, the first groove configured for receiving the optical fiber therein, and further having an outwardly curved bottom surface configured to cause a portion of the optical fiber to be outwardly curved substantially tangential to the top surface of the substrate; and a second groove formed in the top surface, and oriented substantially perpendicular to the first groove, the second groove configured to receive a portion of the electrical conductor therein, the electrical conductor overlying the outward curve of the optical fiber near the point of tangency thereof to the top surface.

12. The system of claim 10, wherein the substrate comprises fused silica.

13. The system of claim 10, wherein the electrical conductor is selected from a group comprising: a wire; and a stripe of electrically conductive material applied to the optical fiber.

14. The system of claim 10, wherein the polishing lap comprises a rotary lapping machine having:

a horizontal rotating platen with an abrasive surface;

a polishing solution delivery conduit for supplying a constant flow of polishing solution to the surface of the platen;

a moveable arm disposed adjacent to the platen, configured to receive the substrate with the optical fiber and the electrical conductor disposed thereon, attached to a distal end of the moveable arm, and to move up and down relative to the abrasive surface, so as to press the electrical conductor, optical fiber and substrate against the platen.

15. The system of claim 14, further comprising an optical probe associated with the moveable arm, and configured for detecting changes in displacement of the distal end of the moveable arm from the reference point, such that the computer may continuously monitor the depth of polishing and send a signal to the polishing lap and moveable arm to discontinue polishing when the desired depth of polishing is reached.

16. A method for controlling a depth to which a polishing lap polishes an optical fiber, comprising the steps of:

(a) placing a length of an optical fiber upon a substrate, such that a portion of the optical fiber assumes an outwardly curved shape relative to a top surface of the substrate;

(b) disposing an electrical conductor over an apex of the curved portion of the optical fiber;

(c) connecting the electrical conductor to a voltage source;

(d) moving the substrate toward the polishing lap so as to first press the electrical conductor against a moving abrasive surface of the polishing lap;

(e) polishing the electrical conductor until it severs;

(f) detecting severance of the electrical conductor by detecting a change in voltage therein;

(g) detecting the position of the fiber relative to the polishing lap when said severance is detected, said position being a reference point; and (h) progressively polishing the curved portion of the optical fiber from the reference point to a desired depth.

17. The method of claim 16, wherein the step of placing a length of an optical fiber upon a substrate further comprises the steps of:

(i) forming a first groove in the top surface of the substrate, the first groove sized to allow insertion of a portion of the optical fiber therein, the groove being configured to cause the portion of the optical fiber disposed therein to curve toward the top surface of the substrate; and (j) forming a second groove in the top surface of the substrate, the second groove oriented substantially perpendicular to the first groove, and sized to allow insertion of a portion of the electrical conductor therein, said second groove configured to coincide with a point of tangency of the curve of the optical fiber to the top surface.

18. The method of claim 17, further comprising the step of cementing the optical fiber into the first groove.

19. The method of claim 16, where in the step of disposing an electrical conductor over the curved portion of the optical fiber comprises a step selected from a group comprising: placing a wire over the fiber approximately at a point of tangency of the fiber to the top surface; and applying a stripe of electrically conductive material to the optical fiber at its point of tangency to the top surface.

20. The method of claim 16, wherein the voltage source comprises a DC voltage source, and wherein:

(i) the step of detecting severance of the electrical conductor comprises detecting a change in the DC voltage in the electrical conductor with a digital input/output device connected to a computer, and sending a signal to the computer indicating the change in DC voltage; and (j) the step of detecting the position of the substrate when severance is detected further comprises the step of providing an optical probe depth sensor indicating the position of the fiber at the time of the voltage change.

* * * * *